3,122,742
RADIO FREQUENCY TO LIGHT FREQUENCY TRANSDUCER

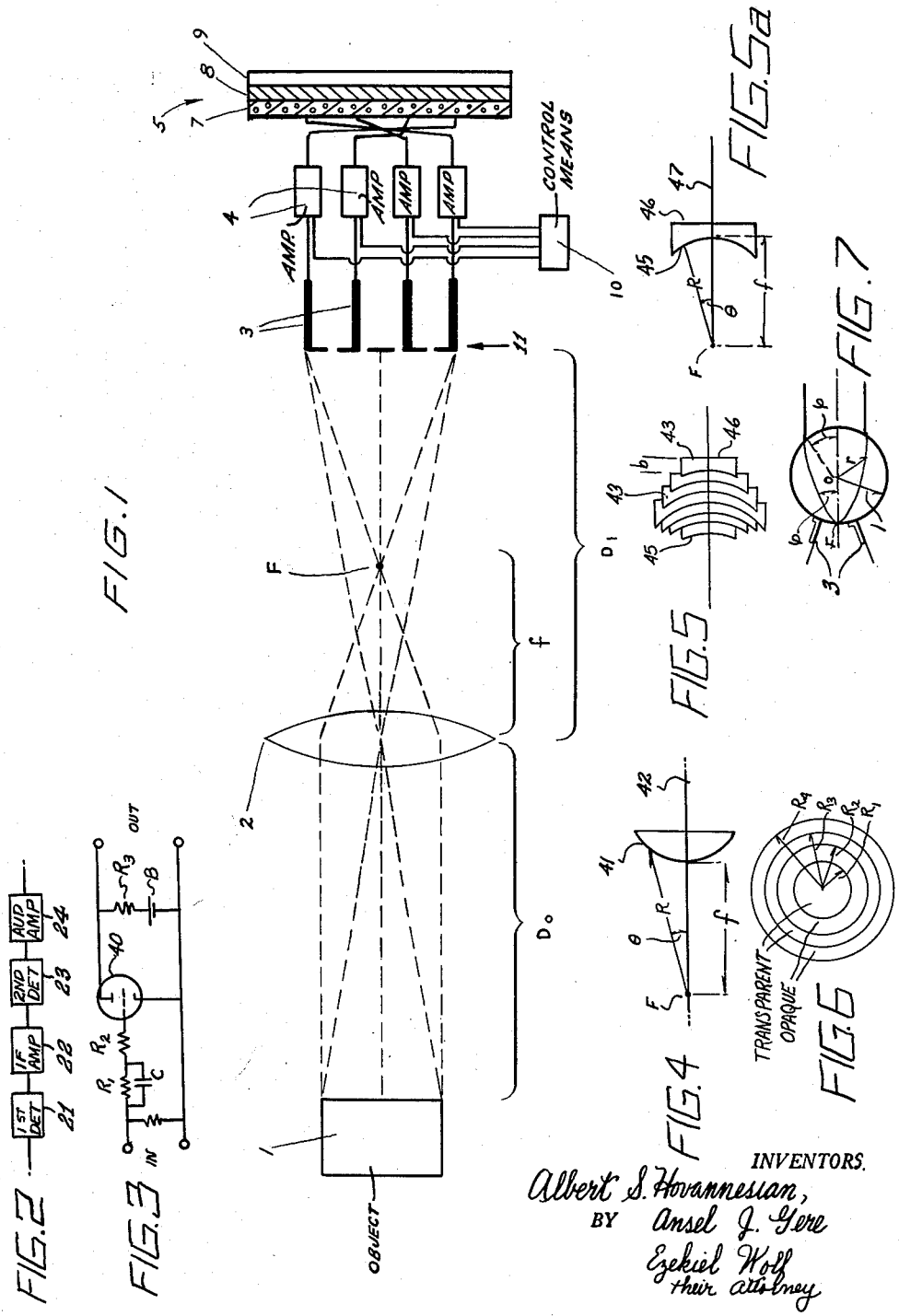

Albert S. Hovannesian, Arlington, and Ansel J. Gere, Westwood, Mass., assignors to Diamond Antenna & Microwave Corporation, Wakefield, Mass.
Filed Nov. 22, 1957, Ser. No. 698,122
5 Claims. (Cl. 343—17)

The present invention relates to a radio frequency to light frequency transducer and more particularly to a device capable of detecting impinging radio frequency signals which may be directly emitted or reflected from a remote stationary or moving body, and translating the received radio frequency signals into light waves on a suitable screen whereby the remote body is visually reproduced.

It is an object of the present invention to provide a device which is economical in construction and operation that is particularly adapted for use as a visual detector for moving bodies such as ships, airplanes, missiles, etc. This device, moreover, is operative regardless of weather conditions over substantially any selected range and is immediately responsive to movement of the observed body.

In particular it is an object of the present invention to provide a device which will visibly display airplane runways and the like from an approaching plane bearing an embodiment of the present invention through the visual resolution on the screen of the device of suitably coded radio frequency signals from radio beacons on the ground. This device may be so constructed as to be selectively sensitive at several modulating frequencies in such a manner as to visually display different colors on a transducing screen.

These and other objects of the present invention will be more clearly understood when considered in connection with the accompanying drawings in which:

FIGURE 1 is a schematic illustration of the present invention,

FIGURE 2 is a schematic illustration of the amplifier system,

FIGURE 3 is a schematic illustration of a modification of a detail of the amplifier system, and FIGURES 4, 5, 5a, 6 and 7 are schematic illustrations of typical lens systems for use in the present invention.

Fundamentally the present invention provides a system in which radio frequency energy reflecting or originating from an object impinges upon a radio frequency lens system through which system the radio frequency image of the object is focussed upon the focal surface in a manner quite similar to optical lens systems. A plurality of selectively arranged radio frequency sensing elements are located in a plurality of substantially point locations in the surface. These sensing elements are in turn individually connected to individual amplifying units. The outputs of these amplifiers are individually connected at points inversely corresponding to the location of the sensing elements in the focal surface to a radio frequency to a light transducing member, such as an electro-luminiscent panel. The system thus described provides a means by which a continuously varying sensitivity of the electro-luminescent panel or other equivalent device to energy imposed upon various portions of this panel, may be observed, with the energy imposed being derived from a detected radio frequency image of a body which may be moving or stationary. It is thus possible by the present invention to continuously observe any radio frequency reflective body, whether stationary or moving, regardless of visual impediments between the body and the lens system, provided however the visual impediments do not substantially absorb the radio frequency energy directed from the reflected body.

Thus referring to FIGURE 1 there is shown an object 1 which represents the reflecting body or alternately a source of radio frequency energy which is to be detected. This body may comprise, for an example, an airplane or an automobile or stationary objects such as buildings and towers. Normally non-reflective or highly lossy materials will not act as suitable bodies.

The lens system 2 is similar to a converging lens system normally found in optics and directs the impinging radio frequency energy into a focal surface 11. The object distance $D_o$, and the focal distance $f$ from the lens determine the image distance D; in a manner similar to that of optical systems. It will be noted that the radio frequency image impinging upon the focal surface 11 as in optical systems is inverted.

The lens system itself may be one of several different types. These include for example a dielectric delay lens, a metal plate lens, Luneberg lens, or a zone plate lens. Any of these types of lens systems which are capable of focusing radio frequency emanating from an object on one side into a radio frequency image in a selected focal surface is suitable.

A dielectric delay lens operates according to well known principles and comprises principally a mass of dielectric materials bounded by carefully determined surfaces which serve to selectively delay portions of the wave front passing therethrough in such a manner that ideally all the rays emanating from a given point on one side of the lens are converged by the lens to a conjugate point behind the lens. It may incidentally be noted that this type of lens as other lenses are subject to various aberrations which limit the efficiency of the lens itself. These include for example chromatic aberrations, spherical aberrations, coma, barrel and pin-cushion distortion, curvature of the field, etc. These difficulties, however, by careful design can be minimized in their effect upon the invention.

A preferred form of the invention contemplates the use of micro-wave lenses which may be either micro-wave plate lenses or artificial dielectric lenses. A metal plate lens or metal step plate lens is basically an arrangement of parallel wave guides where the phase velocity is greater than the velocity of propagation in the surrounding medium, such that the index of refraction of the plate lens appears to be less than unity. The artificial dielectric lens is simply a lattice work of conductors small compared to a wave length which behaves individually like a polarized molecule of a true dielectric and collectively slows the progress of an electromagnetic wave passing through.

The zone plate lens as those indicated above, also has the property of focusing waves of a particular frequency. Such a system as described in "Design and Construction of a Micro-wave Focus System" by Ansel J. Gere, and Robert E. Mueller, thesis M.I.T. 1948, is advantageous because it can be made quite thin and is thereby substantially only of two dimensions. The determination of the focal point is fully explained in the above cited thesis. This lens moreover has a focal surface in which the radio frequency sensing elements may be located.

These lens systems each has the property of conveying radio frequency waves parallel to the axis of the system and passing therethrough into a focal point and therefore such systems have found utility where concentration of energy is desirable. However, the present invention carries the utilization of these systems one step further by making use of the fact that these lenses also direct waves arriving from directions not parallel with the axis of the system into points all lying on a common surface which we have termed the focal surface, such that each point corresponds with a different direction.

Located in the focal surface 11 are a plurality of sensing elements preferably in the form of small dipoles 3. These dipoles 3 should each be located substantially entirely within the focal surface 11 and should be of a size, preferably, such that it will not exceed the circle of confusion which is of course determined by the particular lens in question and the radio frequency being detected. Integral, of course, with the size of the dipole is the radio frequency which is selected for this particular system as the carrier frequency. These dipoles are connected individually with individual amplifier systems indicated at 4.

The amplifier systems 4 are each identical in construction and may be designed in a conventional manner with certain preferred design characteristics herein indicated. These amplifier systems 4 are individually connected to the sensing elements or dipoles 3 from which they individually receive varying radio frequency signals impinging upon the focal surface 11. The amplitude and other tuning adjustments of these amplifying systems 4 should be ganged controlled by a common operating means 10. Each amplifying system 4 may include a tuning capacitor and gain control potentiometer like that in the other amplifying systems. Then the tuning capacitors may be mounted upon one common control shaft and the gain adjusting potentiometers mounted on a second common shaft, the common shafts, each having an attached knob, comprising the common operating means 10. These amplifier systems preferably contain a plurality of series connected detectors and amplifiers, such as shown in FIG. 2.

In the preferred form of this invention the signal which is detected by the system is a radio frequency carrier signal modulated by a precisely determined intermediate frequency.

In the amplifier system the carrier signal is detected and the intermediate frequency is passed through the system.

Additionally in the preferred form of the invention a second modulation is imposed upon the carrier frequency for the purpose of attaining selective signals the purpose of which will more clearly appear hereinafter.

Ideally the amplifier system is a narrow band, highly sensitive amplifier and therefore the second modulation frequency should be in the low kilocycle range.

Thus in an arrangement as shown in FIGURE 2 in which each individual amplifier system comprises in series, a first detector 21, an I-F amplifier 22, a second detector 23 and an audio frequency amplifier 24, the input signal to the first detector 21 as derived from the sensing device 3, may be represented if 100% sinusoidal modulation is assumed, conventionally by the formula $E(t) = A \cos w_1 t (1 + \cos w_2 t)(1 + \cos w_3 t)$, where $E(t)$ is a transmitted voltage, A is a constant, depending upon the parameters of the circuit, $w_1$ is the radio frequency carrier, $w_2$ is the intermediate frequency and $w_3$ is the second modulation frequency. The signal after passing through the first detector stage is $A_1 \cos w_2 t (1 + \cos w_2 t)$. After the I-F stage the signal appears as $$A_2 \cos w_2 t (1 + \cos w_3 t)$$

where $A_1$ and $A_2$ are amplifications of A.

After the second detector the signal appearing is $A_3 \cos w_3 t$ and after the audio frequency amplifier the signal appearing is $A_4 \cos w_3 t$, with $A_3$ and $A_4$ representing, as $A_2$ multiples of the A.

It will be recognized from this description that the maximum band width necessary is $2w_3$ and thus the sensitivity of the device can be substantially greater than those conventionally known in radar units which require band widths measurable in the megacycles. The band width $2w_3$ is limited in a practical sense by the rate at which the image changes and the properties of the light transducing screen or means which is connected to the system.

After suitable amplification the amplifying systems 4 are individually connected to a light emitting source which is activated upon energization from the amplifying systems 4. This light emitting means can consist conceivably of a plurality of mosaic arranged light bulbs, for example, which can be energized to full on, off, or intermediate levels of on, depending upon the level of energy supplied to each. Thus producing a mosaic pattern which corresponds to the image appearing in the focal surface 11. Inasmuch as the image appearing in the focal surface 11 is inverse to the actual object or body 1, the wires connecting the amplifying systems 4 and the light emitting means should be crossed to optically reverse the picture appearing upon energization of the light bulb or the like.

A preferred form of light emitting medium is the relatively newly developed electro-luminescent panels which can be excited to emit light at a plurality of individual points by the expedient of connecting electrodes to these points. One particular advantage of the use of electroluminescent panels is that they can be made to emit light of different colors, depending upon the particular frequency with which they are energized. This means that by using two frequencies of modulation selectively, different colored images can be made to appear on the panel. These electro-luminescent panels schematically indicated at 5 include a plurality of different layers which may vary to some extent depending upon the particular type being used. However they will normally include luminescent particles such as phosphor particles suspended in plastic 7, a transparent or translucent conductive coating 8 and a layer of glass 9. A circuit is completed from each amplifying system 4 by a point contact on layer 7 through a localized section of the luminescent panel 5 and back through layer 8 in such a manner as to activate the local areas of the luminescent panel in response to the amplitude of signal from the amplifier systems 4.

It is clear that a large range of numbers of individual amplifiers and electrodes and their connecting sensing elements may be utilized, depending upon the particular degree of resolution desired. It is clear that several thousand may be used if desired for the purpose of obtaining a substantial television-like resolution. For many purposes however, fewer resolutions are necessary. Inasmuch as a two dimensional picture is rendered, many applications of this device might require a greater degree of resolution in order to accurately supply a necessary history of observation which is necessary on many occasions to determine the exact nature of the objects being viewed and their distance from the viewing screen.

An illustrative form of the present invention may comprise a unit having four sets of sensing elements, amplifying systems and detecting or displaying areas. The amplifying system operates at 9300 megacycle carrier and has an intermediate frequency of 455 kilocycles and a second modulating frequency of 1.5 kilocycles. The lens may comprise a 24″ zone plate of 9.8″ focal length, which has an angular resolution of approximately 4°. Four dipole antenna elements spaced in the focal surface surrounding the principal focus on the corners of a 1″ square, take advantage of the resolution. A greater field of vision with this lens could be obtained by increasing the number of dipoles at 1″ distances together with an increase in the individually associated elements of the additional dipoles. The dipoles should be mounted in a box lined with micro-wave absorbent material to eliminate response to extraneous radiation. A tuned silicon diode and R.F. by-pass are connected to each dipole to act as a first detector. This first detector is physically separated from the other elements of the amplifier system 4, being located adjacent to the dipoles so as to avoid transmission of the R.F. carrier over a coaxial line. The output from the individual first detectors are matched to a low-impedance cable which in turn are individually connected to the remainder of the amplifying systems 4. The individual amplifying systems 4 have a low impedance input matching the cables and two stages of amplification at 455 kc. a second detector and three stages of broad band audio amplification and an output transformer. The screen is an electro-luminescent panel with the secondary of each output transformer connected by a point electrode contact at one end to spaced positions on one side of the electro-luminescent panel and at the other sides through a common lead to the conductive coating of the electro-luminescent panel.

The particular source of radio frequency energy which is either emitted directly from the body being detected or reflected from it, may be generated by a reflex klystron oscillator emitting a square wave modulation at the two selected frequencies of 455 kc. and 1.5 kc. The particular choice of modulation frequencies in the wave forms is however a matter of convenience. It may be noted that in the utilization of this device, one modulation frequency may be generated when considering one source or moving body and a second when considering another. Thus for example, in addition to mere visual observation of the object additional information is conveyed by the frequency of modulation, and this information may be directly utilized to produce different colored displays on the screen 5 selectively sensitive to different frequencies to produce different colored images.

It will be recognized that an amplifier can be arranged so that if a signal is present for a prescribed length of time it will turn off its own output and leave it off until the signal disappears. If such an arrangement is provided in each of the amplifiers, the effect will be to extinguish the light in each element of the mosaic corresponding to the signals received from a stationary object, and therefore to present only the lights corresponding to moving objects. The length of time which a light persists before it is extinguished is under the control of the designer. This feature will be extremely helpful in cases where it is desirable to detect and/or observe only moving objects.

A circuit which accomplishes this for the second modulation frequency is shown in FIGURE 3. In this arrangement resistor $R_1$ and capacitor C in parallel are connected in series with resistor $R_2$ in turn connected to the grid of tube 40. Across the plate and cathode of the tube is the series resistor $R_3$ and power source B.

If an input is present the tube 40 has no bias and operates at full gain. If a signal appears at the input it will appear initially at the output. However, the tube draws grid current, and in a length of time determined by the time constant $R_2C$, the condenser C charges gradually to a voltage great enough to bias the tube to cut off, so that the output gradually disappears. As long as the input signal persists the condenser stays charged, and the output signal does not reappear. However if the input signal disappears, the condenser discharges in a length of time determined by the time constant $R_1C$ and the amplifier returns to full gain, ready to indicate the initiation of another input signal.

The lens systems referred to above may be more fully understood in connection with FIGURES 4 to 7. Thus a dielectric lens made plano-convex as shown in FIGURE 4, is a converging lens. If the convex surface is a hyperbola, whose equation is $$R=\frac{(n-1)f}{n\cos\theta-1}$$

the lens will focus plane waves travelling parallel to the axis 42 at the point F, the principal focus where $n$ the index of refraction is greater than unity. The lens can be composed of a natural or artificial dielectric. Natural dielectrics are well understood. W. E. Koch (Metallic Delay Lens, Bell System Technical Journal 27, 58–82 January 1948) has demonstrated that artificial dielectrics may be constructed and substituted for natural dielectrics, generally with a saving in weight. Whereas a natural dielectric consists of molecular particles of microscopic size, the artificial dielectric consists of discrete metal particles of macroscopic size. The particles may be metal spheres, rods, or discs. The radio waves cause oscillating currents to flow on the particles, and they are, thus, analogous to the oscillating molecular dipoles of a natural dielectric.

Metal plate lens are described and considered in W. E. Koch, Metal Lens Antenna Proc. IRE 34 828–836 November 1946. Whereas dielectric lenses depend for their action on retardation of the wave in the lens, the metal plate lens depends for its action on the acceleration of the wave by the lens. An array of parallel plates having paraboloidal surfaces 45 and plane surfaces 46 (FIGURE 5) spaced apart a distance $b$ appear to energy of wave length polarized parallel to the plates as a medium of dielectric constant $n$, where $$n=\sqrt{1-\left(\frac{\lambda}{2b}\right)^2}$$

Accordingly a plano-concave lens, with concave surface given by $$R=\frac{(1-n)f}{1-n\cos\theta}$$

will cause plane waves parallel to the axis 47 to converge to focus (see FIGURE 5a).

Referring to FIG. 6, there is shown a front view of a zone plate lens for focussing a group of incident parallel rays upon a focal point on the lens axis at a distance $f$ from the lens surface. This lens consists of a circular disc having a series of adjacent annular regions concentric about a central circular region. The regions are alternately opaque and transparent to incident high frequency energy. The radial distance from the axis to the outermost boundary of each zone is defined by the equation $R_k=\sqrt{2kf\lambda}$, where $R_k$ is the radius of the $k'th$ zone from the axis, $f$ is the focal length and $\lambda$ the wave length of the waves to be focussed. The opaque and transparent zones may be interchanged.

Referring to FIG. 7, there is shown a diametrical sectional view through a Luneberg lens. The section has not been cross hatched in order to more clearly illustrate the mode of operation of this lens. The Luneberg lens has the property of focussing parallel rays of high frequency energy incident upon one face of its spherical surface on a focal point on the opposite face of the spherical surface located on a diameter of the sphere parallel to the direction of the incident rays. Thus, it is seen that a bundle of parallel rays incident at the right upon a portion of the spherical surface subtending an angle from the axis of $p$ is focussed upon the point $f$ such that an angle $p$ is subtended by the diameter passing through $f$ and the bundle of rays converged on this focal point. Two receiving elements 3 are shown in contact with the left spherical surface of the Luneberg lens. This lens is especially advantageous in the present system because it is capable of viewing the exceptionally wide solid angle of 90°, despite its compact size. Moreover, since the focal plane lies on its surface, the individual receiving elements 3, may contact the surface of the lens, thereby insuring proper registry with the focal plane to insure a high degree of resolution in the overall system.

As is well known in the art, the Luneberg lens is characterized by an index of refraction which is a function of the radial distance from the center of the sphere. This relationship is given by:

$$n=n_0\sqrt{2-r^2}$$

where $n_0$ is the index of refraction at the center of the sphere, and $r$ is the ratio of the radius at a point within the sphere to the outside radius of the sphere.

There has been described a novel system for presenting a visual representation of objects in response to high frequency energy directed therefrom. The system is characterized by good sensitivity and definition with reliable apparatus requiring relatively few components and ruggedly constructed. By utilizing a pair of these systems, a stereoscopic display may be presented. The individual receiving dipoles may be replaced by open-ended wave guides parallelly arranged with one end in the focal surface and the other at the detector. Numerous other modifications of and departures from the specific examples described herein may be practiced by those skilled in the art without departing from the inventive concepts. Consequently the invention is to be construed as limited only by the spirit and scope of the appended claims.

Having now described our invention, we claim:

1. Apparatus for discriminating between radiant energy directed from fixed and moving objects comprising means for focussing radio frequency energy modulated with a lower fixed frequency signal impinging thereon from said objects into a focal surface, a plurality of radio frequency sensing devices selectively arranged in said focal surface, means for emitting light frequency signals of said lower fixed frequency locally responsive to selectively coupled signals derived respectively from said sensing devices, and selective coupling means for delivering said selectively coupled signals to said light emitting means for a short time interval after a respective sensing device first receives energy from an object and interrupting such delivery immediately after said short time interval to visually display only said moving objects.

2. Apparatus for visually displaying a representation of objects comprising, means for providing rays of high frequency energy directed from said objects modulated by a lower fixed frequency signal, an array of high frequency sensing devices, means for focussing said modulated rays upon said array of high frequency sensing devices, means for detecting said lower frequency signal at each of said sensing devices and selective transmission means having a pass band about said lower frequency for selectively amplifying said detected lower frequency signal while rejecting signals having spectral components outside of a narrow frequency band encompassing said lower frequency.

3. Apparatus in accordance with claim 2, and further comprising, an array of elemental high emissive areas, and means for energizing a respective elemental light emissive area with each selectively amplified signal to visually display a representation of said objects.

4. Apparatus for visually displaying a representation of objects comprising, means for providing rays of high frequency energy directed from said objects modulated by a lower fixed radio frequency signal and an audio fixed frequency signal, an array of high frequency sensing devices, means for focussing said modulated rays upon said array of high frequency sensing devices, selective transmission means having a pass band centered about said lower radio frequency for detecting said lower radio frequency signal modulated by said audio frequency signal at each of said sensing devices, means for selectively amplifying each detected lower radio frequency signal modulated by said audio frequency signal, while rejecting signals having spectral components outside the narrow band including said modulated radio frequency signal and its sidebands, selective transmission means having a pass band centered about said audio frequency for detecting said audio frequency signal from each of the latter amplified signals, means for selectively amplifying each detected audio frequency signal while rejecting signals having spectral components outside the narrow band encompassing said audio frequency, an array of illuminable elemental areas, and means for illuminating a respective elemental area with each of the latter amplified signals to visually display a representation of said objects.

5. Apparatus in accordance with claim 2 wherein said detecting means at each of said sensing devices comprises, a tuned semiconductor diode immediately adjacent to the associated sensing device.

References Cited in the file of this patent

UNITED STATES PATENTS

| | | |
|---|---|---|
| 2,070,640 | Ballantine | Feb. 16, 1937 |
| 2,234,328 | Wolff | Mar. 11, 1941 |
| 2,415,352 | Iams | Feb. 4, 1947 |
| 2,429,933 | Gibson | Oct. 28, 1947 |
| 2,442,951 | Iams | June 8, 1948 |
| 2,453,502 | Dimmick | Nov. 9, 1948 |
| 2,571,165 | Rines | Oct. 16, 1951 |
| 2,576,182 | Wilkinson | Nov. 27, 1951 |
| 2,673,343 | Rines | Mar. 23, 1954 |
| 2,696,522 | Rines | Dec. 7, 1954 |
| 2,835,891 | Peeler et al. | May 20, 1958 |

OTHER REFERENCES

Terman: Radio Engineering, FIG. 15–12, page 748 (3 ed., 1947).